United States Patent [19]

Satou et al.

[11] Patent Number: 5,236,332
[45] Date of Patent: Aug. 17, 1993

[54] METHOD OF CONTROLLING AN INTERNAL COMBUSTION ENGINE

[75] Inventors: Ryuji Satou; Hiroshi Kitagawa, both of Wako, Japan

[73] Assignee: Honda Giken Kogyo Kabushiki Kaisha, Japan

[21] Appl. No.: 946,983

[22] Filed: Sep. 17, 1992

[30] Foreign Application Priority Data

Sep. 18, 1991 [JP] Japan ................................ 3-267303

[51] Int. Cl.$^5$ ........................ F01L 1/34; B60K 28/16
[52] U.S. Cl. .............................. 123/90.15; 123/90.16; 180/197
[58] Field of Search ............... 123/90.15, 90.16, 90.17; 180/197

[56] References Cited

U.S. PATENT DOCUMENTS

| | | | |
|---|---|---|---|
| 4,926,823 | 5/1990 | Kishi et al. | 123/90.16 |
| 5,009,203 | 4/1991 | Seki | 123/90.16 |
| 5,042,436 | 8/1991 | Yamamoto et al. | 123/90.16 |
| 5,046,461 | 9/1991 | Kanehiro et al. | 123/90.16 |
| 5,056,378 | 10/1991 | Aimone et al. | 123/90.16 |

FOREIGN PATENT DOCUMENTS 2-42105  2/1990  Japan .
2-157440  6/1990  Japan .

Primary Examiner—E. Rollins Cross
Assistant Examiner—Weilun Lo
Attorney, Agent, or Firm—Skjerven, Morrill, MacPherson, Franklin & Friel

[57] ABSTRACT

An engine control method which can switch over the valve operating property of an engine in a step-wise manner according to the operating condition of the engine and which can control the slipping of the driven wheels through the use of a leaner air/fuel mixture so that it may not be undesirably affected by the deviations of the actual values of various parameters from the designed values of the parameters. Furthermore, a valve operating property is allowed to be switched over from a low speed condition to a high speed condition only when the output of the engine is not reduced as a result of the switch over.

10 Claims, 4 Drawing Sheets

METHOD OF CONTROLLING AN INTERNAL COMBUSTION ENGINE

TECHNICAL FIELD

The present invention relates to a method of controlling an internal combustion engine which can switch over its valve operating property according to an operating condition of the engine, and can select a leaner air ratio for controlling an excessive slip ratio of driven wheels.

BACKGROUND OF THE INVENTION

Various internal combustion engines have been proposed which can switch over the operating properties of the intake valves or exhaust valves according to the speed and load conditions of the engine. As well known, such a switch over would produce a substantial shock which can be perceived by the vehicle occupant. A valve operating condition switch over device has already been put into practical use to achieve a switch over of the valve operating condition without causing a large change in the engine output in a smooth fashion by switching over the valve operating condition in a step-wise manner at a point where the engine output obtained by the valve operating condition for low speed condition coincides with the engine output obtained by the valve operating condition for high speed condition (Japanese patent laid open publication No. 02-42105).

A traction control device is also put into practical use for automatically controlling the traction force of the driven wheels by detecting the slip ratio of the driven wheels from the speed deviation between the driven wheels and the undriven wheels, and reducing the engine output through the use of a leaner air/fuel ratio when an excessive slipping of the driven wheels is detected (Reference should be made to Japanese patent laid open publication No. 02-157440 and others).

Copending US patent application based on Japanese patent application No. 03-180553 discloses a variable valve actuation control device comprising means for eliminating the shocks resulting from the switch over of the valve operating condition by prohibiting the switch over under certain conditions. The disclosure of this patent application is incorporated into the present application by reference.

In mass produced internal combustion engines, it is not possible to totally eliminate some unevenness in their specifications due to the variations in the manufacturing and control precisions in manufacturing injectors and camshafts. In particular, the error in the air fuel ratio during a traction control involving a leaner air fuel ratio results in a relatively large change in the actual output torque (refer to $\Delta TR < \Delta TL$). Therefore, if the valve operating mode is switched over in a normal manner during a traction control, the actual outputs obtained in the high speed mode and the low speed mode may not agree with each other, and it may happen that the low speed mode gives rise to a lower output torque than the high speed mode. In such a case, the switch over of the valve operating mode would rather lower the output torque, thereby reducing the slip ratio of the driven wheels, with the result that the traction control is discontinued, and the normal air fuel ratio is restored. This in turn would increase the output torque, thereby increasing the slip ratio, and the traction control is thereby restored in such a manner that a hunting phenomenon may be produced.

BRIEF SUMMARY OF THE INVENTION

In view of such problems of the prior art, a primary object of the present invention is to improve an engine control method which can switch over the valve operating property of an engine in a step-wise manner according to the operating condition of the engine and which can control the slipping of the driven wheels through the use of a leaner air/fuel mixture so that it may not be undesirably affected by the deviations of the actual values of various parameters from the designed values of the parameters.

A second object of the present invention is to provide an engine control method for a vehicle provided with an engine having a variable valve actuation control device and with a traction control which is capable of stable control action.

A third object of the present invention is to provide an engine control method for a vehicle provided with an engine having a variable valve actuation control device and with a traction control which is free from a dip in the output torque when the valve operating condition is changed from the low speed mode to the high speed mode even if there are errors in the control parameters and manufacturing errors.

These and other objects of the present invention can be accomplished by providing a method of controlling an internal combustion engine of a vehicle which is equipped with a first function of switching over a valve operating property of the engine according to an operating condition of the engine such as the rotational speed thereof, and a second function of controlling an excessive slip ratio of driven wheels of the vehicle, for instance, by changing an operating parameter of the engine such as an air/fuel ratio, wherein the first function is restricted from switching over the valve operating property of the engine when the second function is invoked. The restriction of the first function can be achieved, for instance, by changing a control parameter of the first function.

According to such a structure, even when the valve operating mode is switched over while a traction control is in effect, no hunting would be developed in the control process, and the traction control can be executed in a stable manner. In particular, even when there are some errors in the control parameters and manufacturing errors, the occurrence of torque dip when the valve operating mode is switched over from the low speed mode to the high speed mode may be avoided.

According to a preferred embodiment of the present invention, the air/fuel ratio is made richer in a high speed mode of the first function than in a low speed mode of the first function so that the occurrence of torque dip when the valve operating mode is switched over from the low speed mode to the high speed mode may be avoided even in the worst case of manufacturing errors. In any case, the object of the present invention can be favorably accomplished if the valve operating property is allowed to be switched over from a low speed mode to a high speed mode only when the output of the engine is not reduced as a result of the switch over.

According to a preferred embodiment of the present invention, there is provided a method of controlling an internal combustion engine of a vehicle which can switch over its valve operating property in a step-wise manner under a condition in which an engine output obtained by a valve operating property for low speed condition substantially coincides with an engine output obtained by a valve operating property for high speed condition, and can select a leaner air ratio for controlling an excessive slip ratio of driven wheels of the vehicle, wherein a speed level of the internal combustion engine at which the valve operating property is switched over is set at a higher value when a leaner air ratio is selected than when a leaner air ratio is not selected.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
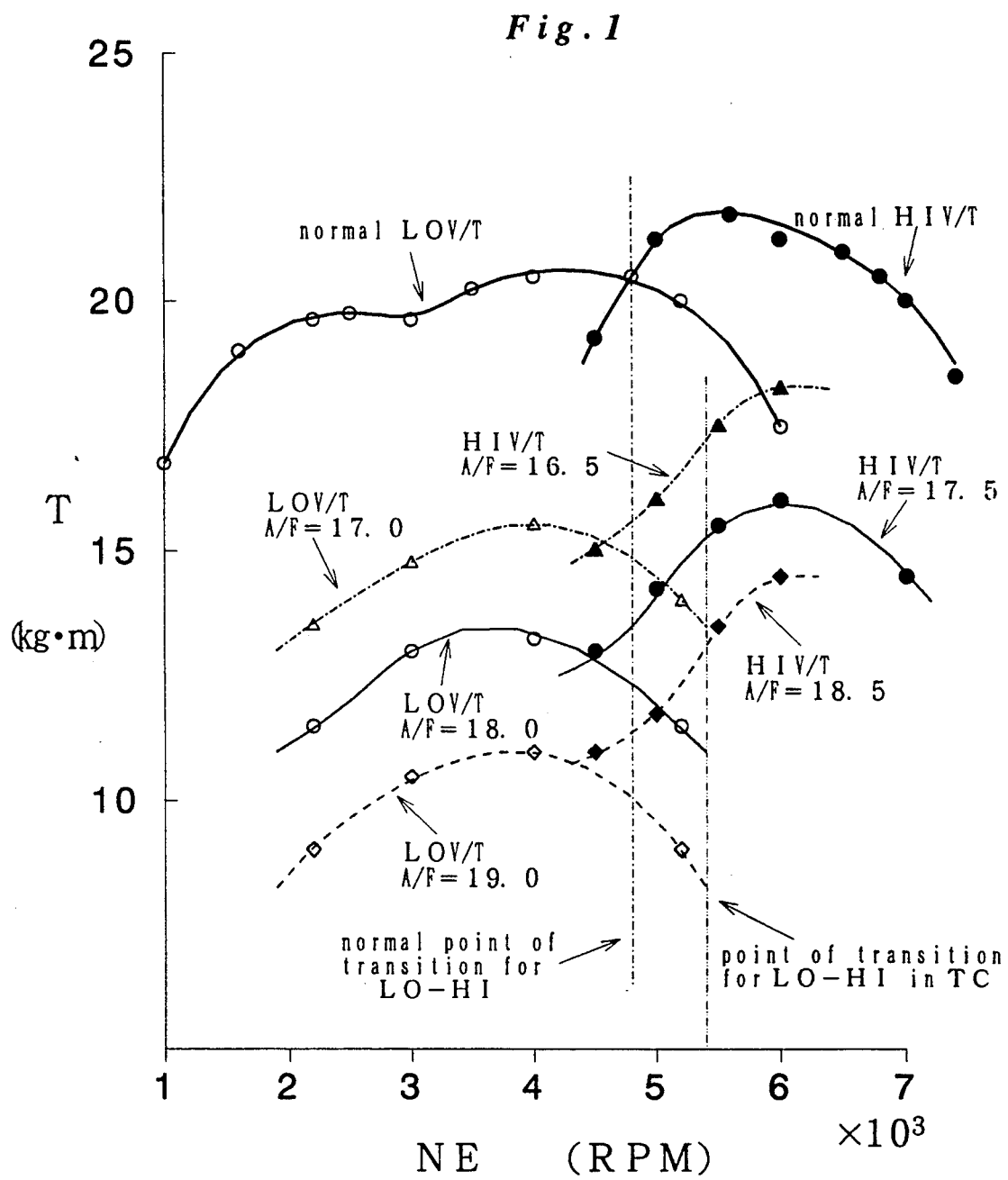
FIG. 1 is graph showing the output property of the engine to which the present invention is applied.

FIG. 1 is a graph showing the relationship between the output torque T and the rotational speed $N_E$ of the engine for different air/fuel ratios to which the present invention is applied. The property curves for the normal air/fuel ratio in the range of 12.0 to 13.0 are indicated in bold lines in an upper part of the graph, and the property curves during the execution of the traction control are indicated by thinner lines. In particular, during the execution of the traction control, the air/fuel ratio is changed over at the same time as effecting the transition from one valve actuation mode to another during the execution of the traction control. Basically, the air/fuel ratio for the low speed mode (LO V/T) is set at 18.0 while the air/fuel ratio for the high speed mode (HI V/T) is set at 17.5 when the traction control is being executed.

When the traction control is being executed, the engine output torque is reduced from the normal level so as to prevent the slipping of the driven wheels by making the air/fuel ratio leaner than the normal levels mentioned above. Suppose that the setting of the air/fuel ratio in the low speed mode was shifted toward the richer side (for instance the air/fuel ratio is 17.0 as indicated by the chain-dot lines in FIG. 1), and the setting of the air/fuel ratio in the high speed mode was shifted toward the leaner side (for instance the air/fuel ratio is 18.5 as indicated by the broken lines in FIG. 1) due to manufacturing errors or control errors. In such a case, transition of the valve actuating mode from the low speed mode to the high speed mode would cause a sharp drop in the output torque of the engine. Such a drop in the output torque due to the change in the valve actuating mode would reduce the slip ratio, which in turn would terminate the traction control and restore the setting of the air/fuel ratio back to the normal level. This in turn would result in an increase in the output torque of the engine, which would increase the slip ratio of the driven wheels again, and would cause the resumption of the traction control. In this manner, the control system may develop a condition of hunting, thereby preventing a satisfactory operation of the traction control and a smooth operation of the vehicle.

In view of this possibility, according to the present invention, the switching point for the transition from the low speed mode to the high speed mode under the condition of the traction control is shifted more toward the high speed and high load side than the normal setting so that a sharp reduction in the output torque may not be caused even in the worst condition.

Figure 2:
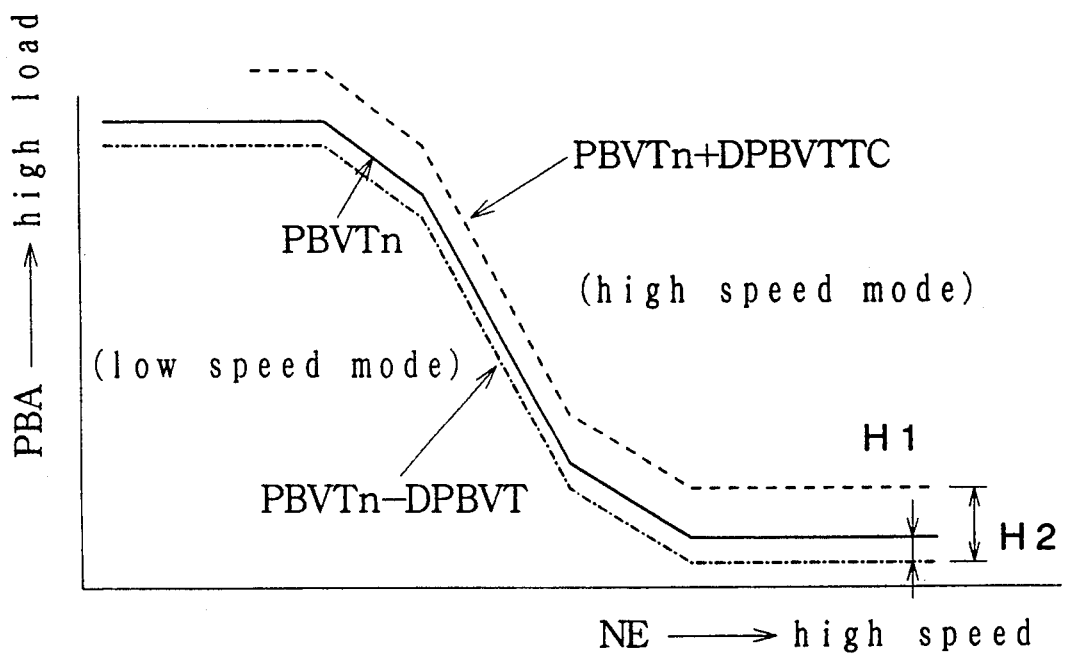
FIG. 2 is a graph showing the principle of the method of switching over between different valve actuating modes.
Figure 3:
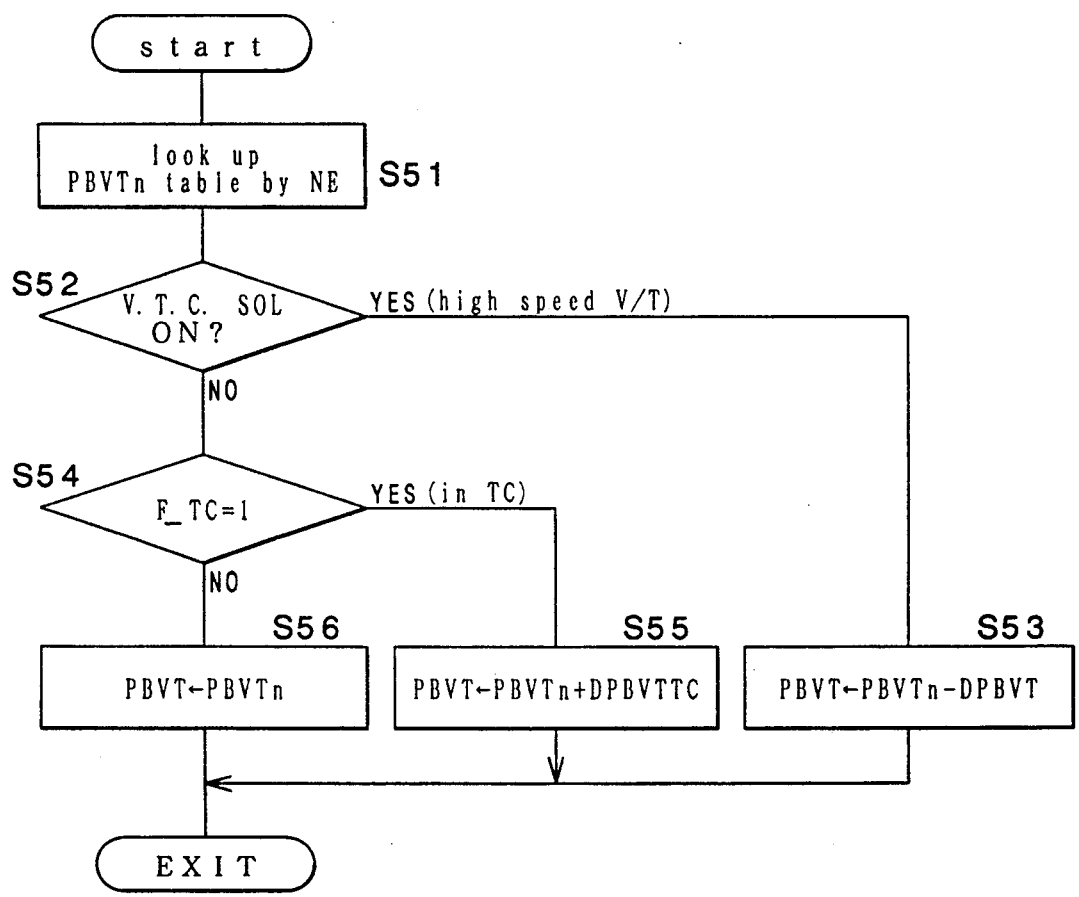
FIG. 3 is a flow chart showing a part of the control process according to the present invention.
Figure 4:
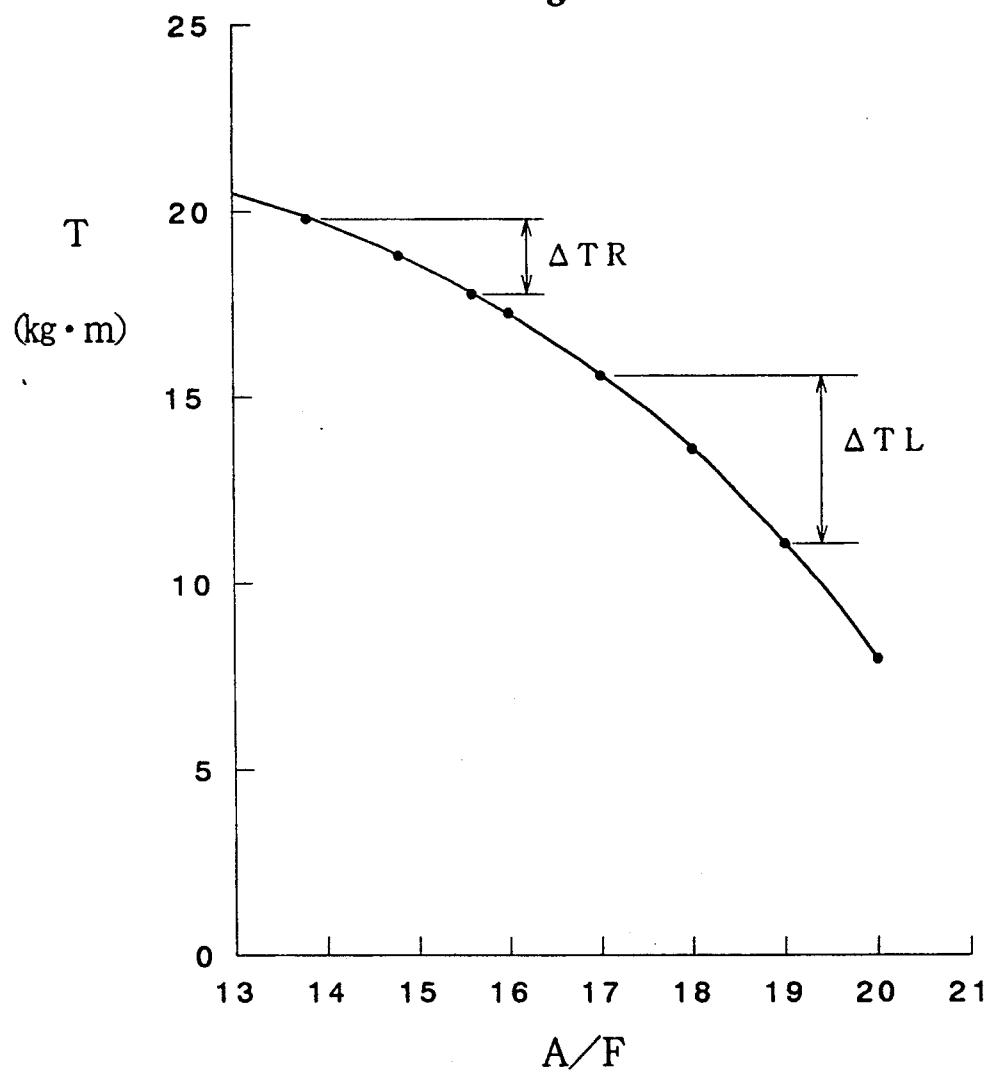
FIG. 4 is a graph showing the relationship between air/fuel ratio and output torque.

FIG. 2 is a conceptual graph corresponding to the look-up tables of the control system (which are mentioned hereinafter) for illustrating the principle of the method for determining the point of transition between the low speed mode and the high speed mode according to the absolute value of the intake negative pressure $P_{BA}$ and the rotational speed of the engine $N_E$. FIG. 3 shows the control flow for shifting this transition point.

In step S51, a table listing the values of the intake negative pressure for mode switch over $P_{BVTN}$ for different rotational speeds of the engine $N_E$ is looked up, and it is determined if the high speed mode or the low speed mode is currently being selected in step S51. If the high speed mode is being selected in step S52, a special map ($P_{BVTN}-D_{PVBVT}$) is set up exclusively for the transition from the high speed mode to the low speed mode as a map for the switch over of the valve actuating mode in step S53.

If the low speed mode is being selected in step S52, it is determined in step S54 if the traction control is being executed or not. If the traction control is detected in step S54, a map ($P_{BVTN}+D_{PBVTT}C$) is set up in step S55 as a map for giving the point of transition from the low speed mode to the high speed mode in which the point of transition is shifted more toward the high speed and high load condition than the normal setting.

If the traction control is not detected in step S54, a normal map $P_{BVTN}$ is set up in step S56 as the map for giving the point of transition from the low speed mode to the high speed mode.

Under normal condition, the transition from the low speed mode to the high speed mode is carried out according to the normal map $P_{BVTN}$ while the transition from the high speed mode to the low speed mode is carried out according to a different map $P_{BVTN}-D_{PBVT}$. There is some difference H1 between these two maps as shown in FIG. 2, and the gap H1 between the two curves in the graph of FIG. 2 makes up a hysteresis which prevents frequent switch-overs in the valve actuating mode.

When the traction control is being executed, yet another map $P_{BVTN}+D_{PBVTT}C$ is employed for giving the point of transition from the low speed mode to the high speed mode so that the transition may occur when the rotational speed of the engine is higher than the normal level for the transition or when the absolute value of the intake negative pressure is greater than the normal level for the transition. As a result, the gap H2 of hysteresis for the transition between the high speed mode and the low speed mode is made broader so that the occurrence of hunting during the traction control may be effectively prevented.

The rotational speed of the engine and the intake negative pressure has a certain correlation, and it is possible to shift the point of transition by shifting the threshold of the rotational speed of the engine while the threshold level of the intake negative pressure is kept fixed or, alternatively, to shift the point of transition by shifting the threshold of the intake negative pressure of the engine while the threshold level of the rotational speed.

Alternatively, it is also possible to set the air/fuel ratio slightly leaner than actually required by taking into account possible control errors without changing the map for valve actuating mode switch over. For instance, when the standard air/fuel ratio for the high speed mode is set at 16.5, a sharp drop in the output torque upon transition from the low speed mode to the high speed mode can be avoided, and the occurrence of hunting may be prevented even when the air/fuel ratio in the low speed mode is somewhat richer than initially designed, and the air/fuel ratio in the high speed mode is somewhat leaner than initially designed.

If the air/fuel ratio deviates towards the leaner side in the low speed mode and towards the richer side in the high speed mode, the change in the output torque resulting from the mode switch over likewise occurs. However, since such deviations are in any case within the combustion limit range of the air/fuel ratio, and a sharp increase in the engine output when the valve operating condition is switched over from the low speed mode to the high speed mode is more tolerable than in the opposite case, neither substantial interference to the stability of the traction control nor seriously undesirable results would be produced.

Thus, according to the present invention, it is possible to avoid the problems which could arise when the above mentioned traction control is applied to an engine equipped with a valve actuating mode switch over control device, and to avoid a sharp change in the output torque of the engine. Thus, a favorable traction control can be accomplished without creating any undesirable problems in an engine equipped with a valve actuating mode switch over control device.

Although the present invention has been described in terms of preferred embodiments thereof, it is obvious to a person skilled in the art that various alterations and modifications are possible without departing from the scope of the present invention which is set forth in the appended claims.

What we claim is:

1. A method of controlling an internal combustion engine of a vehicle which is equipped with a first function of switching over a valve operating property of said engine according to an operating condition of the engine, and a second function of controlling an excessive slip ratio of driven wheels of the vehicle, wherein:
   said first function is restricted from switching over said valve operating property of said engine when said second function is invoked.

2. A method according to claim 1, wherein said control parameter of said first function comprises a rotational speed of said engine, and a level of the rotational speed of said engine at which said valve operating property is switched over from a low speed mode to a high speed mode is set at a first level when said second function is invoked, and at a second level which is different from said first level when said second function is not invoked.

3. A method according to claim 1, wherein said control parameter of said first function comprises a rotational speed of said engine, and a threshold level of the rotational speed of said engine at which said valve operating property is switched over from a low speed mode to a high speed mode is higher when said second function is invoked than when said second function is not invoked.

4. A method according to claim 1, wherein said operating parameter of said engine which may be changed by said second function comprises an air/fuel ratio of said engine, and said control parameter of said first function consists of a rotational speed of said engine, the air/fuel ratio being made richer in a high speed mode of said first function than in a low speed mode of said first function 5. A method according to claim 1, wherein said control parameter of said first function comprises a rotational speed of said engine, and some hysteresis is provided between the levels of rotational speed of said engine at which said valve operating property is switched over from a low speed mode to a high speed mode and at which said valve operating property is switched over from a high speed mode to a low speed mode, the width of said hysteresis being greater when said second function is invoked than when said second function is not invoked.

6. A method according to claim 1, wherein said control parameter of said first function comprises a rotational speed of said engine, and said valve operating property is allowed to be switched over from a low speed mode to a high speed mode only when the output of said engine is not reduced as a result of said switch over.

7. A method of controlling an internal combustion engine of a vehicle which can switch over its valve operating property in a step-wise manner under a condition in which an engine output obtained by a valve operating property for low speed condition substantially coincides with an engine output obtained by a valve operating property for high speed condition, and can select a leaner air ratio for controlling an excessive slip ratio of driven wheels of said vehicle, wherein:
   a speed level of the internal combustion engine at which the valve operating property is switched over is set at a higher value when a leaner air ratio is selected than when a leaner air ratio is not selected.

8. A method according to claim 7, wherein some hysteresis is provided to the point of switch over with respect to the speed level of the internal combustion engine at which the valve operating property is switched over, and the width of the hysteresis is made greater when a leaner air ratio is selected than when a leaner air ratio is not selected.

9. A method according to claim 7, wherein a selected level of said leaner air ratio is richer when the valve operating property for high speed condition is set up than when the valve operating property for low speed condition is set up.

10. A method of controlling an internal combustion engine of a vehicle which can switch over its valve operating property in a stepwise manner under a condition in which an engine output obtained by a valve operating property for low speed condition substantially coincides with an engine output obtained by a valve operating property for high speed condition, and can select a leaner air ratio for controlling an excessive slip ratio of driven wheels of said vehicle, wherein:
   said valve operating property is allowed to be switched over from that for low speed condition to that for high speed condition only when the output of said engine is not reduced as a result of said switch over.

* * * * *